(12) United States Patent
Johansson et al.

(10) Patent No.: US 11,748,217 B2
(45) Date of Patent: Sep. 5, 2023

(54) METHOD FOR FAILURE DETECTION AND ROLE SELECTION IN A NETWORK OF REDUNDANT PROCESSES

(71) Applicant: ABB Schweiz AG, Baden (CH)

(72) Inventors: Bjarne Johansson, Västerås (SE); Mats Rågberger, Högviltsvägen (SE); Anders Rune, Västerås (SE)

(73) Assignee: ABB Schweiz AG, Baden (CH)

( * ) Notice: Subject to any disclaimer, the term of this patent is extended or adjusted under 35 U.S.C. 154(b) by 134 days.

(21) Appl. No.: 17/355,851

(22) Filed: Jun. 23, 2021

(65) Prior Publication Data
US 2022/0004449 A1 Jan. 6, 2022

(30) Foreign Application Priority Data

Jul. 1, 2020 (EP) ..................... 20183508

(51) Int. Cl.
*G06F 11/20* (2006.01)
*G06F 11/07* (2006.01)
*G06F 11/14* (2006.01)

(52) U.S. Cl.
CPC ...... *G06F 11/2028* (2013.01); *G06F 11/0721* (2013.01); *G06F 11/0757* (2013.01); *G06F 11/1425* (2013.01); *G06F 11/2025* (2013.01)

(58) Field of Classification Search
CPC ............. G06F 11/0709; G06F 11/0721; G06F 11/0757; G06F 11/1425; G06F 11/1482; G06F 11/2025; G06F 11/2028; G06F 11/2041; H04L 67/10; H04L 67/1034
See application file for complete search history.

(56) References Cited

U.S. PATENT DOCUMENTS

| | | | |
|---|---|---|---|
| 5,390,326 A * | 2/1995 | Shah | H04L 41/0677 714/717 |
| 6,993,587 B1 * | 1/2006 | Basani | H04L 67/1095 709/244 |
| 9,710,342 B1 | 7/2017 | Weinstein et al. | |
| 9,747,183 B2 | 8/2017 | Bhattacharya et al. | |
| 10,061,664 B2 | 8/2018 | Verkaik et al. | |
| 2008/0120177 A1 * | 5/2008 | Moscirella | H04L 41/082 714/2 |
| 2009/0138751 A1 | 5/2009 | Moore et al. | |
| 2011/0119453 A1 | 5/2011 | Xu et al. | |
| 2011/0161538 A1 | 6/2011 | Decker | |

(Continued)

OTHER PUBLICATIONS

Zonghao Hou, Yongxiang Huang, Shouqi Zheng, Xiaoshe Dong and Bingkang Wang, "Design and implementation of heartbeat in multi-machine environment," 17th International Conference on Advanced Information Networking and Applications, 2003. AINA 2003., 2003, pp. 583-586, doi: 10.1109/AINA.2003.1192949. (Year: 2003).*

(Continued)

*Primary Examiner* — Bryce P Bonzo
*Assistant Examiner* — Albert Li
(74) *Attorney, Agent, or Firm* — WHITMYER IP GROUP LLC

(57) ABSTRACT

A method for failure detection and role selection for a process in a network of redundant processes including a primary process configured to transmit a heartbeat signal with a predetermined interval to the processes of the network.

16 Claims, 8 Drawing Sheets

(56) References Cited

U.S. PATENT DOCUMENTS

2015/0249566 A1 9/2015 Kim et al.
2020/0042410 A1 2/2020 Gupta et al.

OTHER PUBLICATIONS

J. Y. Jo, Y. Seo, H. S. Kim, Y. Go and C. -S. Kim, "Leader Selection Algorithm and Its Verification Environment for Supporting Fault Tolerance," 2019 IEEE/ACIS 18th International Conference on Computer and Information Science (ICIS), 2019, pp. 4-11, doi: 10.1109/ICIS46139.2019.8940322. (Year: 2019).*
Garcia-Molina, Hector; "Elections in a Distributed Computing System"; in IEEE Transactions on Computers, vol. C-31, No. 1; Jan. 1, 1982; 12 Pages.
Tiwari, Kshama, et al.; "Leader Election Approach: A Comparison and Survey"; Journal of Advanced Computing and Communication Technologies (ISSN: 2347-2804), vol. No.3 Issue No. 2; Apr. 2015; 4 Pages.
Extended European Search Report; Application No. 20183508.9; Completed: Nov. 11, 2020; dated Nov. 25, 2020; 8 Pages.
Johansson, Bjarne, et al.; "Heartbeat Bully: Failure Detection and Redundancy Role Selection for Network-Centric Controller"; IECON 2020 The 46th Annual Conference of the IEEE Industrial Electronics Society; Singapore; Oct. 18, 2020, 8 Pages.
Lee, Seok-Hyoung, et al.; "The Fast Bully Algorithm: For Electing a Coordinator Process in Distributed Systems" Information Networking, Wireless Communications Technologies and Network Applications, International Conference, ICOIN 2002, Revised Papers, Part II; Cheju Island, Korea; Jan. 30, 2002; 14 Pages.

* cited by examiner

| Message field | Description |
|---|---|
| BecomeSupervised (BS) | When a set value is equal to the identity of one the receiving processes, this one process should become the supervised process. |
| TieBreaker | A process unique ID used to give precedence when two priorities are equal. |
| Priority | Priority of the process. When the primary fails the highest priority process takes the role as primary process. |
| Reveal | When reveal is set, all processes with higher priority than the sender of the heartbeat are instructed to send a heartbeat within a sender heartbeat period. |

Fig. 4

METHOD FOR FAILURE DETECTION AND ROLE SELECTION IN A NETWORK OF REDUNDANT PROCESSES

FIELD OF THE INVENTION

The present invention generally relates to a method for failure detection and role selection for a process in a network of redundant processes, and to a control unit for executing a process in a network of redundant processes, and to a corresponding computer program product.

BACKGROUND

Distributed Control Systems (DCSs) are often implemented in automation systems for applications in which downtime is costly. Such applications may for example be in the oil industry and relate to production of petroleum products and extraction of oil from oil wells where downtime is costly. An often-used way to reduce downtime is to have multiples of critical hardware, such as for example controller duplication. A commonly used scheme is the M out of N pattern, where N nodes are ready to take over for M operative nodes.

These redundancy schemes are typically one out of two, meaning that there is a backup ready to take over if the primary node fails. The communication between the two hardware units is typically realized over a dedicated, purpose fit, redundancy link. This link allows for using dedicated wires for failure detection, that is, if the primary would fail, hardware support could ensure that the backup detects this.

However, for the next generation of control systems that are network centric, it is desirable to minimize the use of purpose fit, specialized hardware for redundancy purposes, such as links for redundancy communication. Instead generic communication means are to be used, such as Ethernet. For redundancy this allows for redundant control application deployment and hosting in a variety of platforms, such as industrial PCs, cloud servers, or edge devices. It also opens for flexible redundancy configuration in which a primary could have N number of backups, or that a computationally powerful server could act as backup for multiple primary controllers.

Accordingly, to minimize the use of purpose fit, specialized hardware for redundancy purposes, requires a way of detecting a failure and in an efficient way enable a backup controller to take over, using such generic communication means.

SUMMARY

In view of the above-mentioned and other drawbacks of the prior art, it is an object of the present invention to provide a message-based method for failure detection and role selection in a network of redundant processes that at least partly alleviates the drawbacks of prior art.

According to a first aspect of the invention, there is provided a method for failure detection and role selection for a process in a network of redundant processes comprising a primary process being configured to transmit a heartbeat signal with a predetermined interval to the processes of the network, the method comprising: in response to a supervising process in the network not receiving a heartbeat from a primary process within a predetermined time interval, transmitting, by the supervising process, a heartbeat with a reveal command to other processes in the network, the reveal command prompting processes with priority higher than the priority of the supervising process to transmit a heartbeat; receiving heartbeats from the processes with higher priority than the supervising process, wherein the process with highest priority takes the role of primary process, or if the supervising process does not receive a heartbeat, take the role as primary.

The present invention is at least partly based on the realization to utilize heartbeats for both failure detection and role selection. Thus, the heartbeats which are often used in process networks to indicate normal operation of a process, are used for failure detection and role selection without the need for any other messaging. For example, there is no need for dedicated request-response handling for selecting a new primary.

A heartbeat is per se known to the skilled person, and is often used for synchronization of different parts in a computer system or for indicating normal operation of a process. A heartbeat is a periodic signal transmitted between processes.

Communication between processes, i.e. for transmitting heartbeats may be performed using hardwired communication such as Ethernet, or wireless solutions such as Wifi, Bluetooth, 3G-5G, etc. Further, the processes may operate on the same control unit, i.e. on the same processor, whereby software means and protocols are used for allowing the processes to communicate with each other. It should be understood that heartbeat transmission between software modules is known per se and the skilled person can foresee various ways of enabling such transmission.

The failure detection is based on a heartbeat transmitted with a certain interval from a supervised process, i.e. a primary process. The supervising processes assume that a heartbeat should be observed within a certain interval. If no heartbeat message is received within this interval, the supervised process is assumed to have failed.

The role selection is based on the heartbeat exchanged by the failure detection, i.e. no additional message is needed. Thus, the inventors realized that the heartbeats used for failure detection can also be used for the role selection by means of message fields in the heartbeats.

A role is herein the role that a certain process has in the network, where being a primary process is one such role. A primary process is the process responsible for a given task, and the other processes are redundant processes that may take over as primary, depending on e.g. a priority level of a given process.

A transmitted heartbeat may be a multicast heartbeat. In other words, the heartbeat is sent in a one-to-many manner to all the processes in the network.

A network of redundant processes may be a network centric process control system.

A "process" should be interpreted broadly and generally includes a computer program and the activity or service provided by the computer program. A process may thus refer to an instantiation and execution of a computer program product. Thus, a process requires CPU time and memory to execute the computer program product.

A process may be hosted on a controller, on a computer device such as a PC, or on a so-called Edge device. Generally, a process may be driven by any device or module that can drive execution of a computer program product.

For example, each process may be considered a node in the network. Each node may comprise a processor and a computer program product storing instructions that, when executed by the processor, causes the node to run the instructions to provide an activity or service.

In possible implementations, several processes are executed by the same controller or processor. Thus, the controller/processor hosts several nodes, each node comprising a computer program product storing instructions that, when executed by the processor, causes the node to run the instructions to provide an activity or service.

In embodiments, the method may comprise taking, by at least one other process in the network, a secondary role based on the priority order of the at least one other process. Thus, since the priority levels of the processes are known to all the processes, further roles may be taken by processes in the network other than the primary process, based on their priority order. This provides for additional roles to be distributed at the same time as the primary process is selected.

For example, the secondary role may be a backup role indicating a process being prospect for taking the role of primary process. One or more processes may take the role as backup process. A process maintains the backup role and is continuously updated with states from the primary process, i.e. it receives heartbeats from the primary process, so that a process being a backup process is ready to take over as primary process.

In embodiments, the heartbeats transmitted in response to the reveal command, may be received by at least each of the processes in the subset of processes, whereby all the processes that received the response heartbeat are informed of the new primary process. Accordingly, due to the multicast heartbeat, information of the new primary is efficiently transmitted to all the processes. A heartbeat message may for example comprise a message field with information indicating the priority of the process that multicasted the heartbeat. Accordingly, since the heartbeats are continuously multicasted, the processes in the network are continuously informed of the priority level of the processes in the network.

In embodiments, the heartbeats transmittable by the processes may comprise message fields including at least a field indicating the priority of the process, a reveal command field, and a tiebreaker indicator. A tiebreaker indicator may be a value or string that distinguishes the process from other processes. In case two processes have the same priority, a rule or algorithm evaluates the tiebreaker indicators in order to give one of the processes precedence over the other.

Thus, if two processes are considered to have the same highest priority, the primary process is determined based on the tiebreaker indicators associated with the two processes.

Preferably, at least the processes in the subset may be executable by separate physical control units.

It is also conceivable that at least two of the processes may be executable on the same physical control unit.

Preferably, transmitting the heartbeats comprises multicasting the heartbeats such that all processes receive the heartbeats.

According to a second aspect of the invention, there is provided a control unit configured to execute a supervising process comprising a computer program product storing instructions for providing an activity, the supervising process being part of a network of redundant processes comprising a primary process configured to transmit a heartbeat signal with a predetermined interval to the at least a subset of processes of the network, the control unit comprising means for: in response to the supervising process not receiving a heartbeat from the primary process within a predetermined time interval, controlling the supervising process to transmit a heartbeat with a reveal command to at least the subset of processes in the network, the reveal command prompting processes with priority higher than the priority of the supervising process to transmit a heartbeat; and receiving heartbeats from the processes with higher priority than the supervising process, wherein the process with highest priority takes the role of primary process, or if the supervising process does not receive heartbeat, taking the role as primary.

The control unit may be configured to execute at least the supervising process and one other process of the network.

The control unit may be configured to execute each process of the network. The control unit may be configured to execute each process of the subset of processes.

Further effects and features of the second aspect of the invention are largely analogous to those described above in connection with the first aspect of the invention.

According to a third aspect of the invention, there is provided a method for role selection for a first process in a network of redundant processes comprising a primary process being configured to transmit a heartbeat signal with a predetermined interval to at least a subset of processes of the network, the method comprising: in response to receiving, by the first process, a heartbeat with a reveal command from a supervising process of the network, transmitting, by the first process, if a priority of the first process is higher than the priority of the supervising process, a heartbeat to at least the subset of processes of the network, receiving, by the first process, at least one heartbeat indicating the priority of at least a subset of the redundant processes, wherein if the priority of the first process is higher than the priorities of the other processes of the subset, taking the role as primary process in the network.

The method may comprise if a priority of the first process changes, transmitting, by the first process to at least the subset of the redundant processes, a heartbeat comprising a reveal command prompting processes with priority higher than the priority of the first process to transmit a heartbeat; wherein if the priority of the first process is higher than the priorities of the other processes of the subset, taking the role as primary process in the network. Accordingly, the first process may inform, in a subsequent heartbeat, the other processes of its new priority, and include a reveal command in the subsequent heartbeat, in order to check whether the first process should take over as primary, thus, advantageously providing for role selection in the absence of failure.

Further effects and features of the third aspect of the invention are largely analogous to those described above in connection with the first aspect and the second aspect of the invention.

According to a fourth aspect of the invention, there is provided a control unit configured to execute a first process comprising a computer program product storing instructions for providing an activity, the first process being comprised in a network of redundant processes comprising a primary process being configured to transmit a heartbeat signal with a predetermined interval to at least a subset of processes of the network, the control unit comprising means for: in response to receiving a heartbeat with a reveal command from a supervising process of the network, transmitting, if a priority of the first process is higher than the priority of the supervising process, a heartbeat from the first process to at least the subset of processes of the network, receiving heartbeats indicating the priority of at least a subset of the redundant processes, wherein if the priority of the first process is higher than the priorities of the processes of the subset, controlling the first process to take the role as primary process in the network.

The means comprised in the control units may refer to computer program products comprising instructions or code for providing the steps.

Further effects and features of the fourth aspect of the invention are largely analogous to those described above in connection with the first aspect, the second aspect, and the third aspect of the invention.

In a fifth aspect of the invention, there is provided a computer program product comprising a computer readable medium having stored thereon computer program means for executing a supervising process in a network of redundant processes comprising a primary process being configured to transmit a heartbeat signal with a predetermined interval to at least a subset of processes of the network, wherein the computer program product comprises: code for in response to the supervising process in the network not receiving a heartbeat from the primary process within a predetermined time interval, executing a transmission of a heartbeat with a reveal command, from the supervising process to at least the subset of processes in the network, the reveal command prompting processes with priority higher than the priority of the supervising process to transmit a heartbeat; code for, in the absence of received heartbeats in response to the reveal command, taking, by the supervising process, the role as primary process.

Further effects and features of the fifth aspect of the invention are largely analogous to those described above in connection with the other aspects of the invention.

In a sixth aspect of the invention, there is provided a computer program product comprising a computer readable medium having stored thereon computer program means for executing a first process in a network of redundant processes comprising a primary process being configured to transmit a heartbeat signal with a predetermined interval to at least a subset of processes of the network, wherein the computer program product comprises: code for, in response to receiving, by the first process, a heartbeat with a reveal command from a supervising process of the network, and if a priority of the first process is higher than the priority of the supervising process, executing a transmission of a heartbeat from the first process to at least the subset of processes of the network, code for evaluating the priorities indicated by at least one, by the first process, received heartbeat; and code for taking, by the first process, the role as primary process in the network if the priority of the first process is higher than the priorities of the other processes of the subset.

Further effects and features of the sixth aspect of the invention are largely analogous to those described above in connection with the other aspects of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein:

FIG. 4 is a table indicating some preferred message fields of a heartbeat message;

DETAILED DESCRIPTION

In the present detailed description, various embodiments of the present invention are herein described with reference to specific implementations. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the scope of the invention.

Figure 1A:
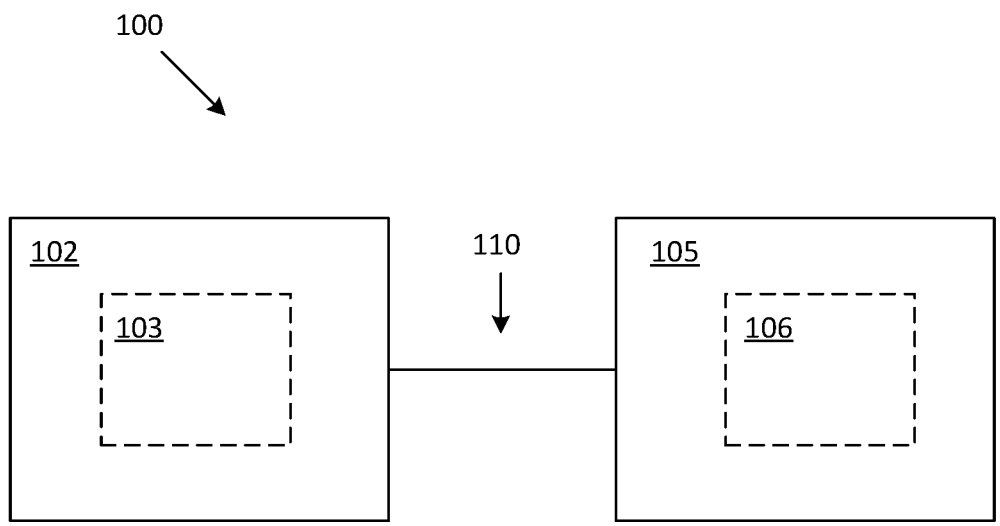
FIG. 1A conceptually illustrates a network of processes according to an embodiment of the invention.

FIG. 1A conceptually illustrates a network 100 of processes. Here, the network comprises a first computer device 102 comprising a controller 103 configured to execute a process and a second computer device 105 comprising a controller 106 configured to execute a process. The controller 103 may be a primary controller and controller 106 may be a backup controller. A communication link 110, such as a redundancy link, which may be based on Ethernet communication, allows the primary controller 103 and the backup controller 106 to communicate with each other across the communication link 110. A heartbeat may be transmitted using the communication link 110. The controllers 103 and 106 may having stored instructions for execution of a computer program product.

Figure 1B:
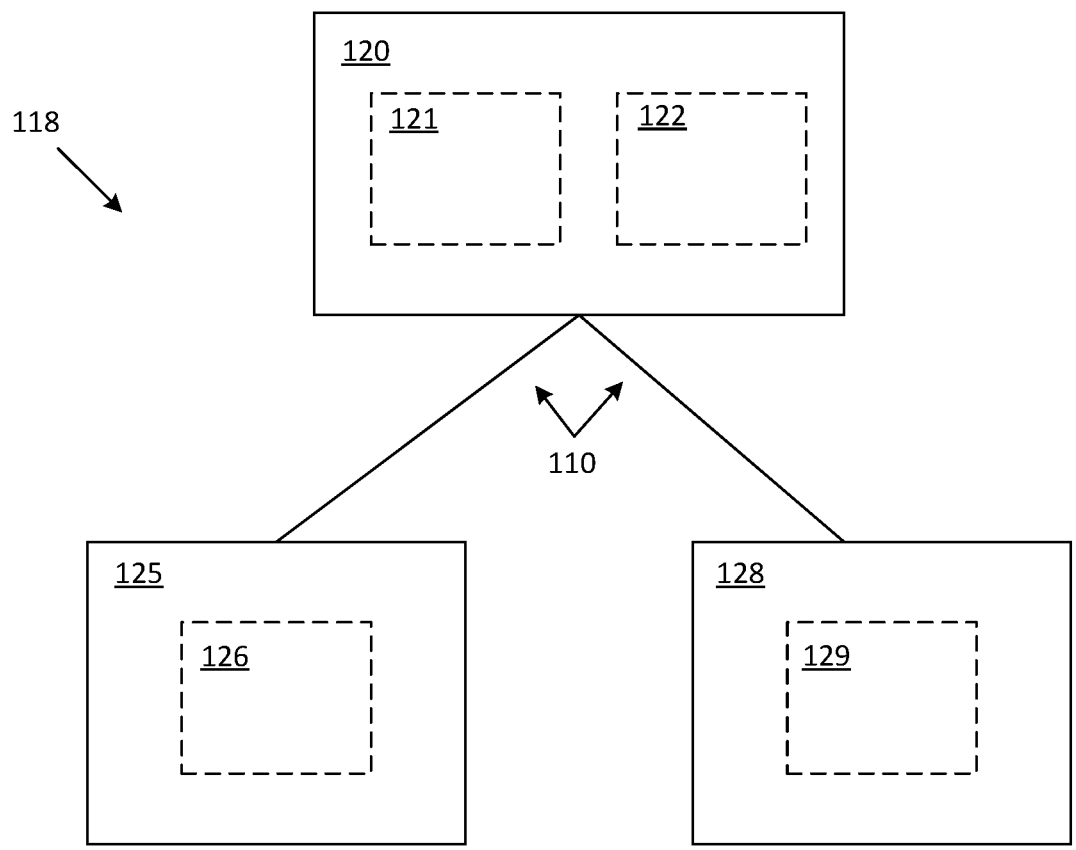
FIG. 1B conceptually illustrates a network of processes.

FIG. 1B illustrates another example network 118 of processes. Here, the controllers 121 and 122 may share a hardware 120, whereas the hardware 125 comprises a controller 126 and the hardware 128 comprises a controller 129. The controller 126 and the controller 129 may both be primary controllers, and the primary controller 126 has backup controller 121, whereas the primary controller 129 has backup controller 122. The backup controllers 121 and 122 share hardware 120. As in FIG. 1A, the primary controllers 126 and 129 communicate with the backup controllers 121 and 122 over the communication link 110.

Figure 2:
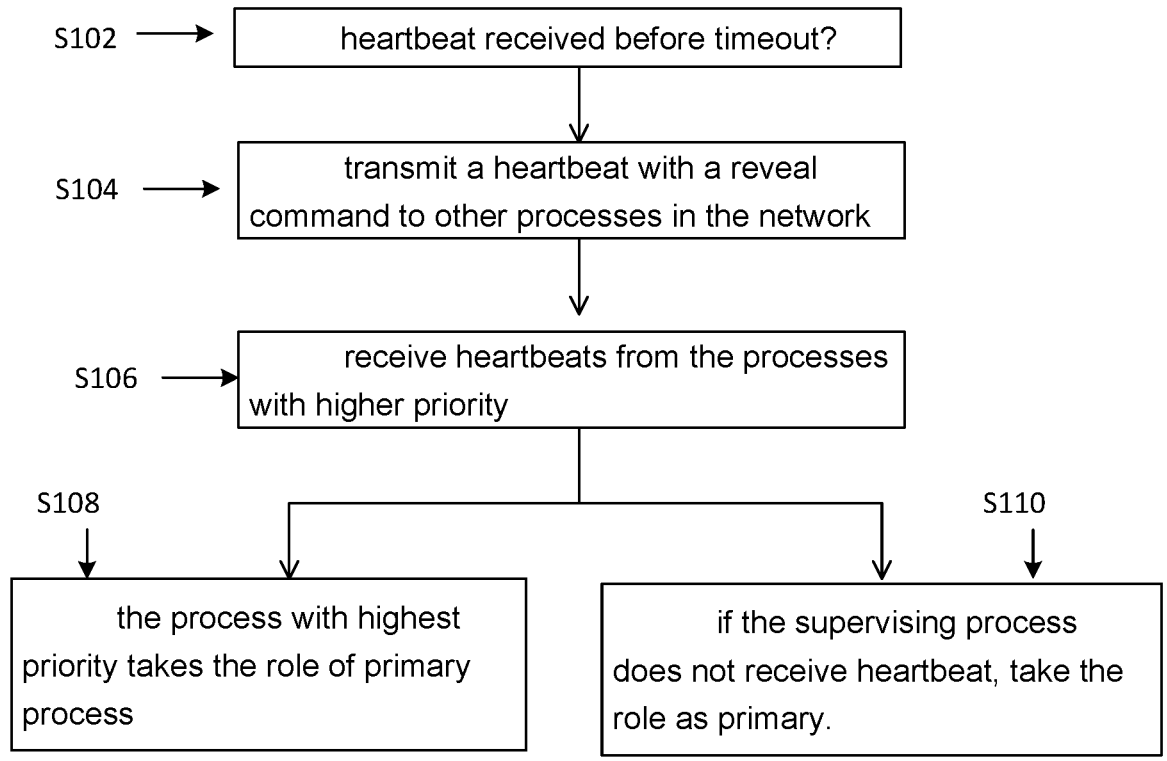
FIG. 2 is a flow-chart of method steps according to embodiments of the present invention.
Figure 3A:
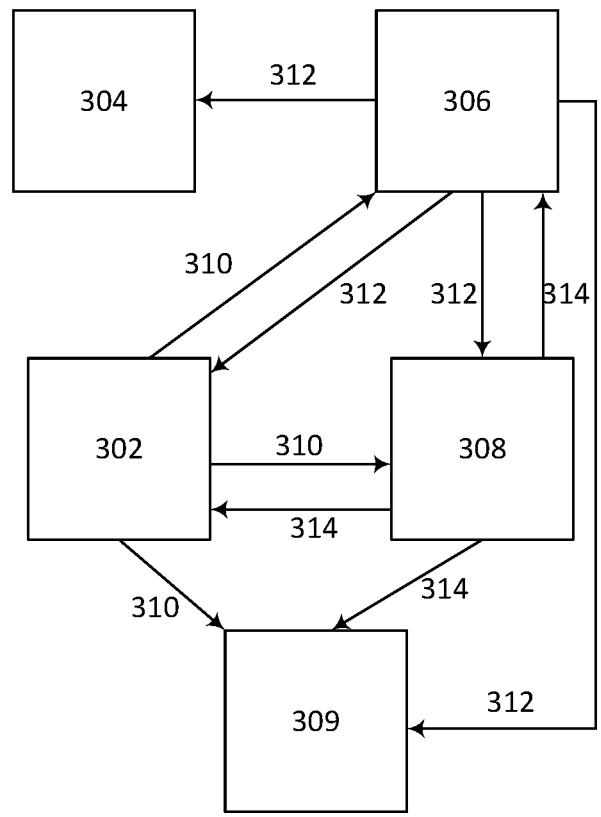
FIG. 3A conceptually illustrates a network of processes according to an embodiment of the invention.

FIG. 2 is a flow-chart of method steps according to embodiments of the invention, while FIG. 3A conceptually illustrates a network of redundant processes 302, 304, 306, 308, 309. In FIG. 3, process 302 is assumed to be a supervising process and process 304 is assumed to be a presently primary process. The steps in FIG. 2 are for a method for failure detection and role selection for a process in a network of redundant processes comprising a primary process being configured to transmit a heartbeat signal with a predetermined interval to at least a subset of processes of the network and will be described in conjunction with FIG. 3A.

In step S104, in response to a supervising process 302 in the network not receiving a heartbeat from the primary process 304 within a predetermined time interval in step S102, transmitting, by the supervising process 302, a heartbeat 310 with a reveal command to at least the subset of processes 306, 308, and 309 in the network. The reveal command prompting processes with priority higher than the priority of the supervising process to transmit a heartbeat. The reveal command may be provided by setting a value different from zero or any other predetermined value, in a reveal message field of the heartbeat. When other processes 306, 308, and 309 receive the heartbeat and detect that the reveal is set, they are prompted to multicast a heartbeat to reveal their priority in a priority message field of their respective heartbeat message, if their respective priority is higher than the priority of the supervising process 302.

Next, in step S106, receiving, by at least the supervising process, heartbeats 312, 314 from the processes with higher priority than the supervising process 302. In this way are the processes in the redundant network informed of the priority of the other processes, or at least the processes with higher priority than the supervising process. In the conceptual example network shown in FIG. 3A, the processes 306 and 308 have higher priority than the supervising process 302, whereby they multicast heartbeats 312 and 314 respectively. The heartbeats 312 and 314 are multicast to all processes in the network. Consequently, if the heartbeats transmitted in response to the reveal command are received by each of the processes, all the processes that received the response heartbeat are informed of the new primary process.

In response to this, the process with highest priority takes the role of primary process in step S108. For example, if process 306 has the highest priority, which it will know since it receives the heartbeat 314 with information about the priority of the other process 308 also having higher priority than the supervising process. Alternatively, if the supervising process 302 does not receive a heartbeat in response to the reveal command included in the heartbeat 310, it takes the role as primary in step S110. Thus, in such case, there was no process with higher priority than the supervising process 302.

Further, the process 308 which here had lower priority than the process 306, may take a secondary role based on its priority being second in order. For example, the secondary role may be a backup role indicating that the process 308 is prospect for taking the role of primary process.

The table in FIG. 4 indicates some preferred message fields of a heartbeat message. The message fields include at least a field indicating the priority of the process, a reveal command field, and a tiebreaker indicator. Further, a become supervised process indicates whether the process should be supervised. The message can of course be extended with other fields that are suitable. Such as an address to the supervised process, or commands for disabling the supervision, or sequence number. Address of the supervised process could be suitable to include; it could serve as mean that allows backups to report their status back to the primary.

If two processes are considered to have the same highest priority, determining the primary process is based on the tiebreaker indicators associated with the two processes. The decision is then determined based on a rule or algorithm the selects the process to take precedence over the other with the same priority based on the tiebreaker indicator.

As shown in FIG. 1A the processes 103 and 106 may be operative on separate physical control units 102 and 105. Similarly, the processes 126 and 129 are operative on separate hardware 125 and 128 as shown in FIG. 1B. However, as also shown in FIG. 1B at least two of the processes 121, 122 are operative on the same physical hardware.

In more detail, for failure detection, the primary process cyclically sends a multicast heartbeat with a heartbeat period. The supervising processes, i.e., the backup processes, checks every heartbeat period if a heartbeat has been received. Thus, there may be more than one supervising processes, such as a plurality of supervising processes. A maximum number of absent heartbeats may be allowed. However, if no heartbeats are received from the supervised primary process after a predetermined failure time period, the supervising process assumes that the primary process has failed.

Each time a supervising process receives a heartbeat from the primary process, the predetermined failure time period is reset, and the supervising process again checks for a heartbeat. The predetermined failure time period may be longer than or the heartbeat period of the primary process. Alternatively, two different heartbeat periods are used, one for the supervised process, i.e. a sender heartbeat period, and one for the supervising processes, i.e. a receiver heartbeat period. In such case, the sender heartbeat period must be less than the receiver heartbeat period in order to avoid false positives failure indications.

Advantageously, the role selection is based on the failure detection to enable a deterministic role selection. The role selection algorithm is based on a prospect state interaction with the failure detection algorithm, and on the reveal command functionality described above. More specifically as described above, the "reveal" forcibly instructs all processes with higher priority than the sender of the reveal command to reveal themselves and their priority. In response to revealing themselves, the processes enter prospect states. Advantageously, the process with the highest priority will transition to the primary state. When determining which process has highest priority, the TieBreaker is also included in the assessment. The processes with lower priority than the highest priority process, are configured to transition back to a backup state, if they were transitioned to the prospect state in the first place.

Figure 3B:
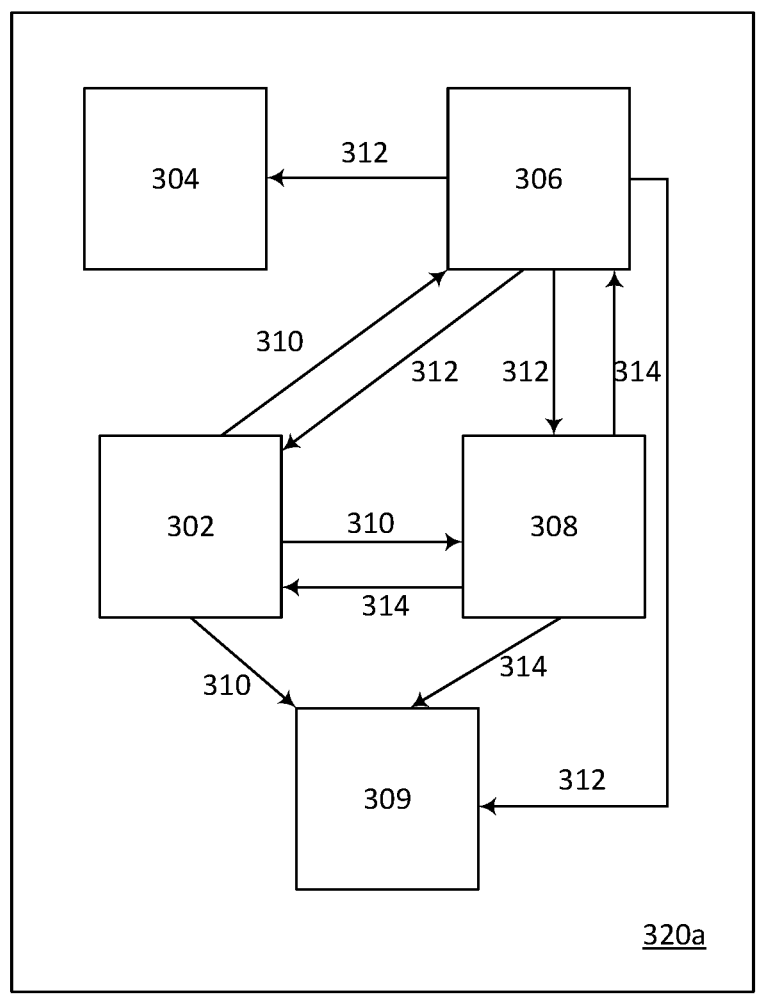
FIG. 3B conceptually illustrates that processes may be executed on the same control unit according to an embodiment of the invention.

Turning now to FIG. 3B, conceptually illustrating that the processes 302, 304, 306, 308, 309 may be executed on the same control unit 320a. Thus, the control unit 320a comprises a memory, or has access to a computer readable medium storing instruction for executing a process. Each process 302, 304, 306, 308, 309 may here relate to a separate computer program product executed by the control unit 320a to provide a control service or activity.

Figure 3C:
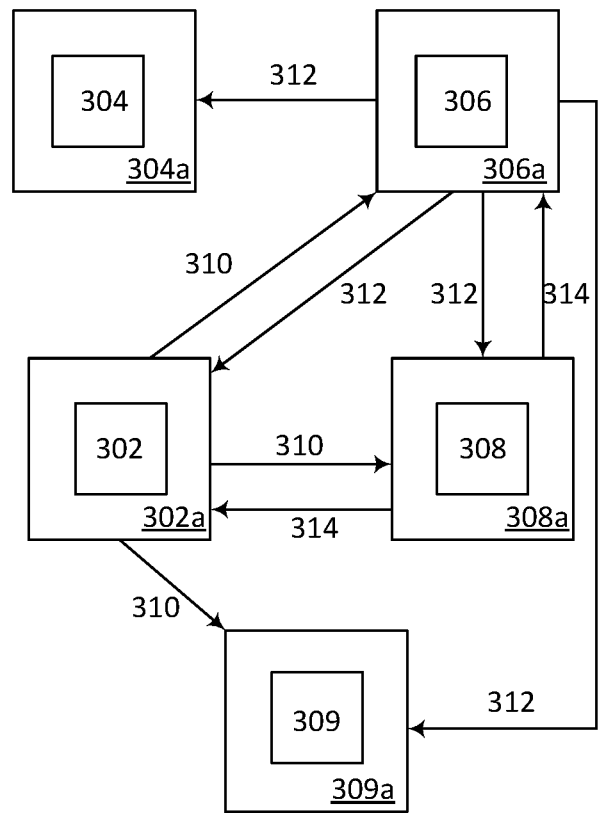
FIG. 3C conceptually illustrates that processes may be executed on separate control units according to an embodiment of the invention.

Turning now to FIG. 3C, conceptually illustrating that the processes 302, 304, 306, 308, 309 may be executed by separate control units 302a, 304a, 306a, 308a, and 309a. Thus, each control unit comprises a memory, or has access to a computer readable medium for storing instructions for executing a respective process. Each process 302, 304, 306, 308, 309 may relate to separate computer program products executed by the respective control unit running on their own operative systems to provide a control service or activity.

A control unit, e.g. 320a in FIG. 3B or 302a in FIG. 3C may be configured to execute a supervising process 302 comprising a computer program product storing instructions for providing an activity or control service in a network of redundant processes in which a primary process is configured to transmit a heartbeat signal with a predetermined interval to at least a subset of the processes of the network. The control unit 302a or 320a comprises means for: in response to the supervising process not receiving a heartbeat from the primary process 304 within a predetermined time interval, controlling the supervising process to transmit a heartbeat with a reveal command to at least the subset of processes 306, 308, 309 in the network, the reveal command prompting processes with priority higher than the priority of the supervising process to transmit a heartbeat. The control unit 302a or 320a further comprises means for receiving heartbeats from the processes with higher priority than the supervising process, wherein the process with highest priority takes the role of primary process, or if the supervising process does not receive any heartbeat, the control unit 302a, 320a controls the supervising process to taking the role as primary process. The control unit 302a, 320a comprises suitable input/output means for receiving and transmitting heartbeats and software modules for interpreting the heartbeat message fields.

Figure 5:
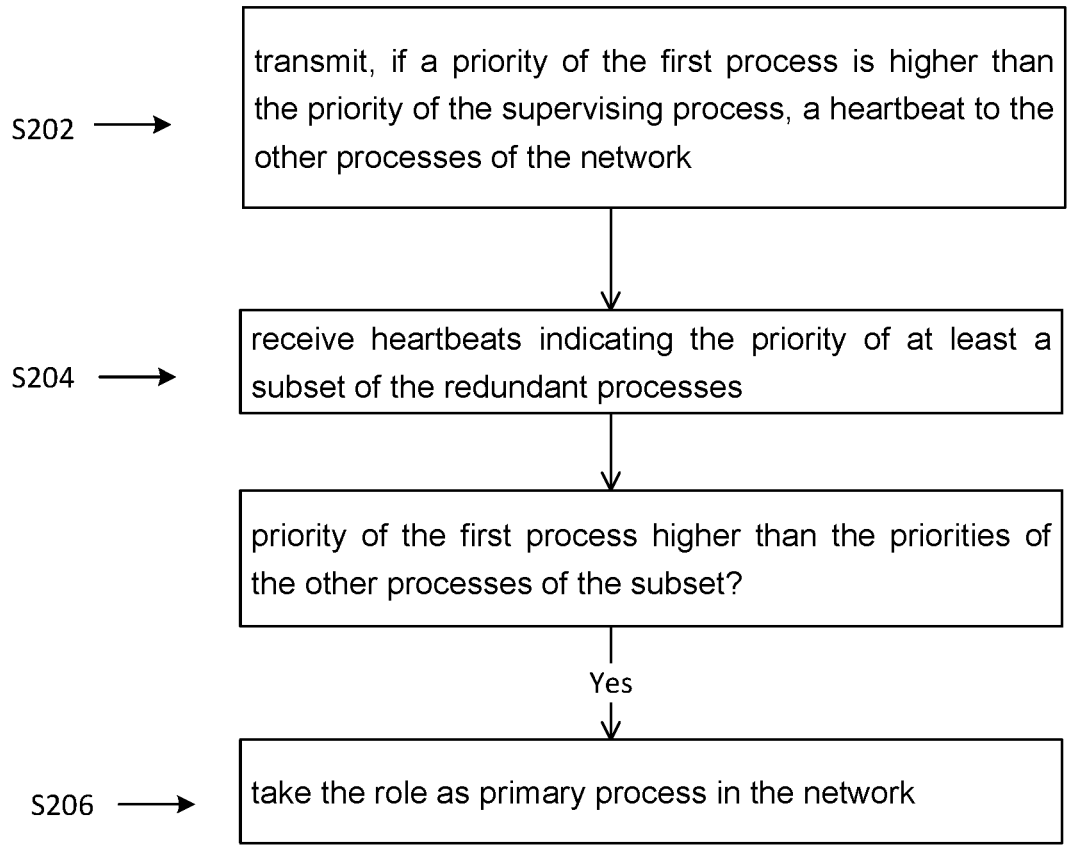
FIG. 5 is a flow-chart of method steps according to embodiments of the present invention.

FIG. 5 is a flow-chart of method steps according to embodiments of the invention, The steps in FIG. 5 are for a role selection for a first process 306 in a network of redundant processes 302, 306, 308 309, comprising a primary process being configured to transmit a heartbeat signal with a predetermined interval to at least a subset of processes of the network and will be described in conjunction with FIG. 3A.

In step S202, in response to receiving, by the first process 306 a heartbeat 310 with a reveal command from a supervising process 302 of the network, transmitting, if a priority of the first process 306 is higher than the priority of the supervising process 302, a heartbeat 312 by the first process 306 to at least the subset of processes 304, 308, 309, 302 of the network.

In step S204, receiving, by at least the first process 306, at least one heartbeat 314 indicating the priority of at least a subset of the redundant processes, here the subset only includes the process 308, wherein if the priority of the first process 306 is higher than the priorities of the other processes 308 of the subset, the first process 306 is configured to take the role as primary process in the network.

Figure 6:
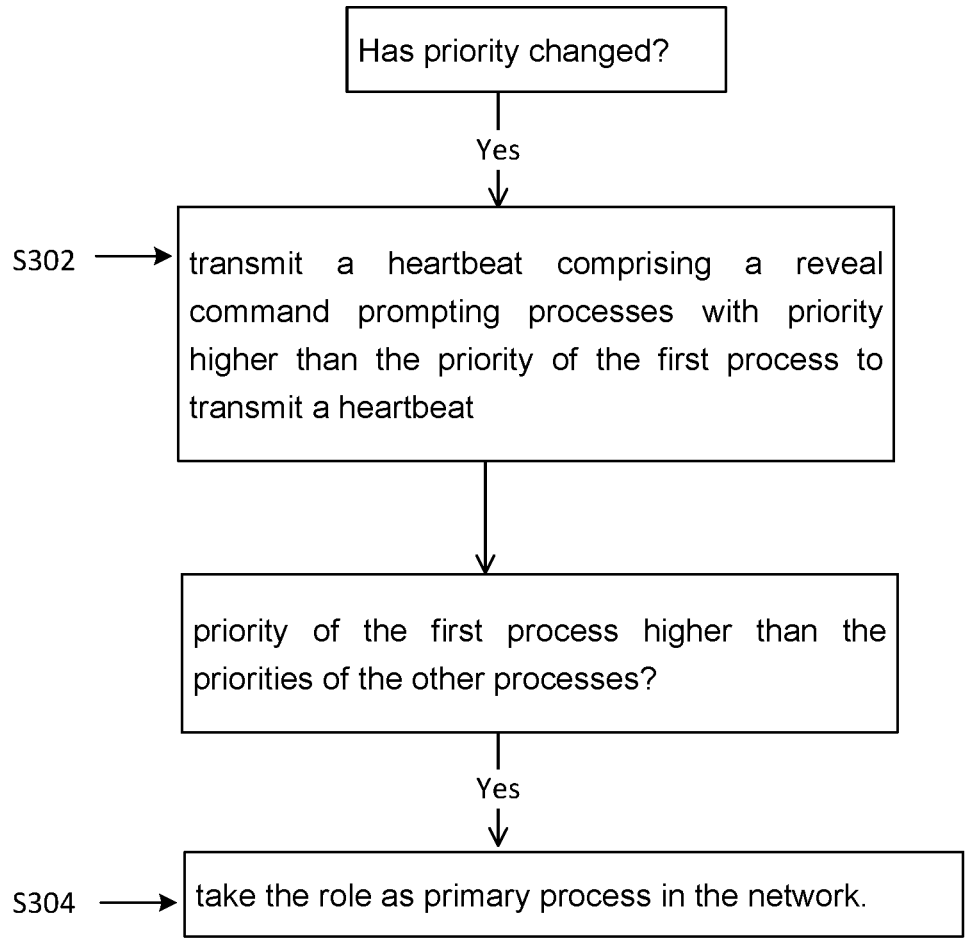
FIG. 6 is a flow-chart of method steps according to embodiments of the present invention.

Further, and now turning to FIG. 6, if a priority of the first process 306 changes, in step S302, by the first process to at least the subset of the redundant processes 302, 304, 306, 308 309, a heartbeat is transmitted comprising a reveal command prompting processes with priority higher than the priority of the first process to transmit a heartbeat. If the priority of the first process is higher than the priorities of the other processes of the subset, the role as primary process in the network in step S304 is taken.

In one embodiment, there is provided a control unit 306a or 320a configured to execute a first process 306 comprising a computer program product storing instructions for providing an activity, being part of in a network of redundant processes comprising a primary process configured to transmit a heartbeat signal with a predetermined interval to at least a subset of processes of the network. The control unit comprising means for in response to receiving a heartbeat 310 with a reveal command from a supervising process 302 of the network, transmits, if a priority of the first process 306 is higher than the priority of the supervising process 302, a heartbeat 312 from the first process 306 to at least the subset of processes of the network.

Further, the control unit 306a/320a (for 320a, see FIG. 3C) comprises means for receiving, by/for the first process 306, heartbeats 314 indicating the priority of at least a subset of the redundant processes 308, wherein if the priority of the first process 306 is higher than the priorities of the processes of the subset, the control unit 306a/320a controls the first process 306 to take the role as primary process in the network.

There is further provided a network of redundant processes comprising a primary process being configured to transmit a heartbeat signal with a predetermined interval to at least a subset of processes of the network, the network further comprises at least one supervising process configured to, in response to not receiving a heartbeat from the primary process within a predetermined time interval, transmit, a heartbeat with a reveal command to at least a subset of processes in the network, the reveal command prompting processes with priority higher than the priority of the supervising process to transmit a heartbeat. The supervising processes of the network are configured to receive heartbeats from the processes with higher priority than the respective supervising process, wherein the supervising process in the network with highest priority takes the role of primary process, or if the supervising process that transmitted the reveal comment does not receive a heartbeat, it takes the role as primary process.

A control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which correspond to tangible media such as data storage media, or communication media including any media that facilitate the transfer of a computer program from one place to another, e.g., according to a communication protocol. In this manner, computer-readable media generally may correspond to (1) tangible computer-readable storage media which are non-transitory or (2) a communication media such as signal or carrier waves. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer.

Even though the invention has been described with reference to specific exemplifying embodiments thereof, many different alterations, modifications and the like will become apparent for those skilled in the art.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for failure detection and role selection for a process in a network of redundant processes, the network of redundant processes comprising a primary process configured to transmit a heartbeat signal with a predetermined interval to at least a subset of processes of the network, the method comprising:
    in response to a supervising process in the network not receiving the heartbeat signal from the primary process within a predetermined time interval, transmitting, by the supervising process, a heartbeat with a reveal command to at least the subset of processes in the network, the reveal command prompting processes with priority higher than the priority of the supervising process to transmit a heartbeat;
    receiving, by the supervising process, heartbeats transmitted from the processes with higher priority than the supervising process, wherein the heartbeats transmitted from the processes in response to the reveal command are received by at least each of the processes in the subset, wherein the process with highest priority takes the role of primary process, and all the processes that received the heartbeats transmitted in response to the reveal command are informed of the new primary process,
    or
    if the supervising process does not receive a heartbeat, taking, by the supervising process, the role as primary process.

2. The method according to claim 1, comprising:
    taking, by at least one other process in the network, a secondary role based on the priority order of the at least one other process.

3. The method according to claim 2, wherein the secondary role is a backup role indicating a process being prospect for taking the role of primary process.

4. The method according to claim 2, wherein the heartbeats transmittable by the processes includes message fields including at least a field indicating the priority of the process, a reveal command field, and a tiebreaker indicator.

5. The method according to claim 2, wherein if two processes are considered to have the same highest priority, determining the primary process based on tiebreaker indicators associated with the two processes.

6. The method according to claim 1, wherein the heartbeats transmittable by the processes includes message fields including at least a field indicating the priority of the process, a reveal command field, and a tiebreaker indicator.

7. The method according to claim 1, wherein if two processes are considered to have the same highest priority, determining the primary process based on tiebreaker indicators associated with the two processes.

8. The method according to claim 1, wherein at least the processes in the subset are executable by separate physical control units.

9. The method according to claim 1, wherein at least two of the processes in the subset are executable by the same physical control unit.

10. The method according to claim 1, wherein transmitting the heartbeats comprises multicasting the heartbeats such that all processes receive the heartbeats.

11. A control unit configured to execute a supervising process, the supervising process comprising a computer program product storing instructions for providing an activity, the supervising process being part of a network of redundant processes comprising a primary process configured to transmit a heartbeat signal with a predetermined interval to at least a subset of processes of the network, the control unit comprising means for:
    in response to the supervising process not receiving the heartbeat signal from the primary process within a predetermined time interval, controlling the supervising process to transmit a heartbeat with a reveal command to at least the subset of processes in the network, the reveal command prompting processes with priority higher than the priority of the supervising process to transmit a heartbeat; and
    receiving heartbeats from the processes with higher priority than the supervising process, wherein the heartbeats transmitted from the processes in response to the reveal command are received by at least each of the processes in the subset, wherein the process with highest priority takes the role of primary process, and all the processes that received the heartbeats transmitted in response to the re veal command are informed of the new primary process, or
    if the supervising process does not receive a heartbeat, taking the role as primary process.

12. A method for role selection for a first process in a network of redundant processes, the network of redundant processes comprising a primary process configured to transmit a heartbeat signal with a predetermined interval to at least a subset of processes of the network, the method comprising:
    in response to receiving, by the first process, a heartbeat with a reveal command from a supervising process of the network, transmitting, by the first process, if a priority of the first process is higher than the priority of the supervising process, a heartbeat to at least the subset of processes of the network,
    receiving, by the first process, at least one heartbeat indicating the priority of at least a subset of the redundant processes, wherein if the priority of the first process is higher than the priorities of the other processes of the subset,
    taking the role as primary process in the network.

13. The method according to claim 12, comprising:
    if the priority of the first process changes, transmitting, by the first process to at least the subset of processes, a heartbeat comprising a reveal command prompting processes with priority higher than the priority of the first process to transmit a heartbeat;
    wherein if the priority of the first process is higher than the priorities of the other processes of the subset,
    taking the role as primary process in the network.

14. A control unit configured to execute a first process the first process comprising a computer program product storing instructions for providing an activity, the first process being comprised in a network of redundant processes the comprising a primary process configured to transmit a heartbeat signal with a predetermined interval to at least a subset of processes of the network, the control unit comprising means for:
    in response to receiving a heartbeat with a reveal command from a supervising process of the network, transmitting, if a priority of the first process is higher than the priority of the supervising process, a heartbeat from the first process to at least the subset of processes of the network, receiving heartbeats indicating the priorities of at least a subset of the redundant processes, wherein if the priority of the first process is higher than the priorities of the processes of the subset, controlling the first process to take the role as primary process in the network.

15. A computer program product comprising a non-transitory computer readable medium having stored thereon computer program means for executing a supervising process in a network of redundant processes comprising a primary process being configured to transmit a heartbeat signal with a predetermined interval to at least a subset of processes of the network, wherein the computer program product comprises:

code for, in response to the supervising process in the network not receiving the heartbeat signal from the primary process within a predetermined time interval, executing a transmission of a heartbeat with a reveal command from the supervising process to at least the subset of processes in the network, the reveal command prompting processes with priority higher than the priority of the supervising process to transmit a heartbeat;

code for, receiving, by the supervising process, heartbeats transmitted from the processes with higher priority than the supervising process, wherein the heartbeats transmitted from the processes in response to the reveal command are received by at least each of the processes in the subset wherein the process with highest priority takes the role of primary process, and informing all the processes that received the heartbeats transmitted in response to the reveal command of the new primary process, code for, in the absence of received heartbeats in response to the reveal command, taking, by the supervising process, the role as primary process.

16. A computer program product comprising a non-transitory computer readable medium having stored thereon computer program means for executing a first process in a network of redundant processes, the network of redundant processes comprising a primary process configured to transmit a heartbeat signal with a predetermined interval to at least a subset of processes of the network, wherein the computer program product comprises:

code for, in response to receiving, by the first process, a heartbeat with a reveal command from a supervising process of the network, and if a priority of the first process is higher than the priority of the supervising process, executing a transmission of a heartbeat from the first process to at least the subset of processes of the network, code for evaluating, by the first process, the priorities indicated by at least one received heartbeat; and code for taking, by the first process, the role as primary process in the network if the priority of the first process is higher than the priorities of the other processes of the subset.

* * * * *